United States Patent
Goss et al.

(10) Patent No.: US 7,904,839 B2
(45) Date of Patent: Mar. 8, 2011

(54) SYSTEM AND METHOD FOR CONTROLLING ACCESS TO ADDRESSABLE INTEGRATED CIRCUITS

(75) Inventors: John R. Goss, South Burlington, VT (US); Paul J. Grzymkowski, Essex Junction, VT (US); Robert McMahon, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 564 days.

(21) Appl. No.: 11/954,646

(22) Filed: Dec. 12, 2007

(65) Prior Publication Data

US 2009/0158444 A1 Jun. 18, 2009

(51) Int. Cl.
*G06F 17/50* (2006.01)

(52) U.S. Cl. .............. 716/1; 716/16; 716/17; 716/18; 711/163; 711/164; 711/165; 711/211; 711/220; 726/26; 726/27; 726/28; 726/29; 726/30

(58) Field of Classification Search .......... 716/1, 16–18; 711/163–165, 211, 220; 726/26–30
See application file for complete search history.

(56) References Cited

U.S. PATENT DOCUMENTS

| | | | |
|---|---|---|---|
| 5,781,793 A | 7/1998 | Larvoire et al. | |
| 6,298,447 B1 | 10/2001 | Wang | |
| 6,510,522 B1 | 1/2003 | Heinrich et al. | |
| 6,823,282 B1 | 11/2004 | Snyder | |
| 7,065,621 B2 * | 6/2006 | Hidai et al. | 711/163 |
| 2008/0196106 A1 * | 8/2008 | Friedrich | 726/27 |

OTHER PUBLICATIONS

First Office Action dated Feb. 26, 2010 in related U.S. Appl. No. 11/959,525.
Response to Office Action dated May 26, 2010 in related U.S. Appl. No. 11/959,525.
Terminal Disclaimer dated May 26, 2010 in related U.S. Appl. No. 11/959,525.
Related U.S. Appl. No. 11/459,367, filed Jul. 24, 2006.
Notice of Allowance and Issue Fee Due dated Jul. 1, 2010 in related U.S. Appl. No. 11/959,525.

* cited by examiner

*Primary Examiner* — Nghia M Doan
(74) *Attorney, Agent, or Firm* — Downs Rachlin Martin PLLC

(57) ABSTRACT

A circuitry access system for controlling access to addressable circuit elements of an integrated circuit. The circuitry access system includes a first storage element having a first listing of unique identifiers each identifier representing one of the addressable circuit elements. A selector distinguishes a first subset of unique identifiers from the first listing. A second storage element receives and stores the first subset in an arrangement that does not include an indication of the absence of any unique identifier of the first listing that is not included in the first subset. An output of second storage element allows a user of the integrated circuit to access one or more of the addressable circuit elements corresponding to the first subset of unique identifiers. A method of controlling access to addressable circuit elements is also provided.

17 Claims, 2 Drawing Sheets

SYSTEM AND METHOD FOR CONTROLLING ACCESS TO ADDRESSABLE INTEGRATED CIRCUITS

FIELD OF THE INVENTION

The present invention generally relates to the field of integrated circuits. In particular, the present invention is directed to a system and method for controlling access to addressable embedded circuitry.

BACKGROUND

It is often desirable to deliver an integrated circuit to a customer while limiting the ability of the customer to access particular portions of the integrated circuit. Typically, an integrated circuit supplier can not simply omit instructions on how to access circuitry that is to be protected. The practice of protection through omission does not necessarily prevent the customer from determining the existence and function of non-disclosed circuitry. Improved systems for regulating access to portions of an integrated circuit are desired.

SUMMARY OF THE DISCLOSURE

In one implementation, a circuitry access system for controlling access to addressable circuit elements of an integrated circuit, each circuit element having an address, is provided. The system includes a first storage element having a first listing of unique identifiers each identifier representing one of the addressable circuit elements; a selector in electrical connection with said first storage element for distinguishing a first subset of unique identifiers from said first listing of unique identifiers, the first subset representing circuit elements allowed to be addressed by a user; and a second storage element in electrical connection with said selector for receiving said first subset and storing said first subset in an arrangement that does not include an indication of the absence of any unique identifier of the first listing not included in said first subset, said second storage element including an output for allowing a user of the integrated circuit to access one or more of the addressable circuit elements corresponding to said first subset of unique identifiers.

In another implementation, a circuitry access system for controlling access to addressable circuit elements of an integrated circuit, each circuit element having an address, is provided. The system includes a first storage element having a first listing of unique identifiers, each of said unique identifiers representing one of the addressable circuit elements, said first listing including a first subset of restricted access unique identifiers; a second storage element in electrical connection with said first storage element, said second storage element having a plurality of memory locations each for receiving one of said unique identifiers of said first listing to which said second storage element has access, said second storage element including an output for allowing a user of the integrated circuit to access the addressable circuit elements corresponding to any unique identifiers in said second storage element; a passcode entry circuit for receiving a passcode from a user of the integrated circuit; and a mode circuit for changing access to said first listing in said first storage element, based on said passcode, wherein if said passcode corresponds to authorized access to said first subset, said mode circuit allows said first subset to be written to said second storage element.

In yet another implementation, a method of controlling access to addressable circuit elements of an integrated circuit, each element having an address, is provided. The method includes storing a plurality of unique identifiers in a first memory, each of the plurality of unique identifiers corresponding to an address of one of the addressable circuit elements; copying a first subset of the plurality of unique identifiers to a second memory in an arrangement that does not include an indication of the absence of any unique identifiers that are not in the first subset, and allowing a user of the integrated circuit to utilize the first subset stored in the second memory to gain access to the addressable circuit elements corresponding to the unique identifiers of the first subset.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Exemplary embodiments of a system and method for controlling access to addressable circuit elements of an integrated circuit where each circuit element has an address are described below, for example, with respect to FIGS. 1 to 2. In one exemplary aspect, such a system and method may allow a service provider (or other permitted entity) access to protected circuitry while preventing access to protected circuitry by another (e.g., a restricted) entity. In another exemplary aspect, such a system and method may allow temporary access to protected circuitry by an integrated circuit provider (or other entity) while preventing access to the protected circuitry by anyone thereafter. It should be understood that the present disclosure is not limited to these (or any other) particular examples.

Figure 1:
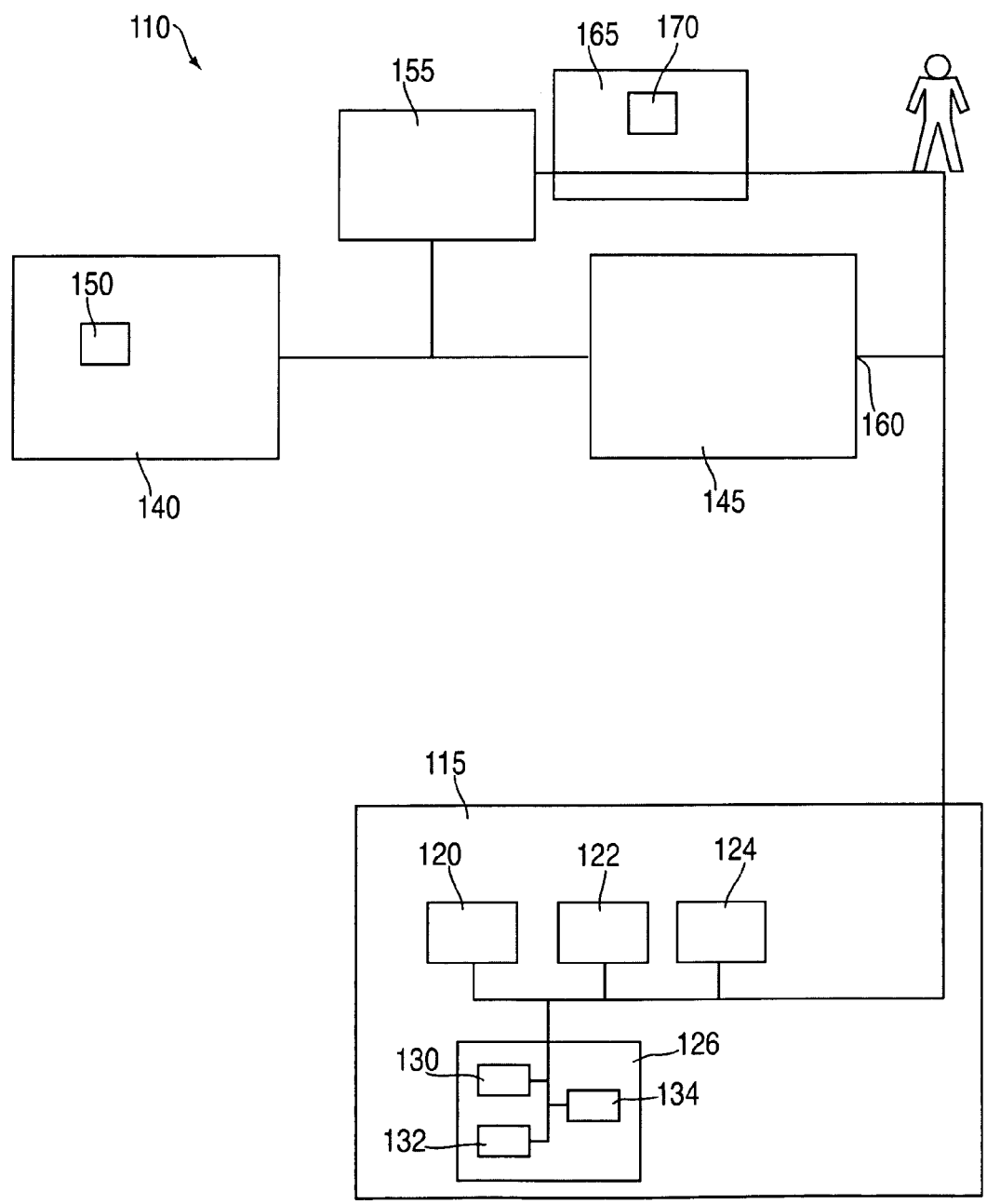
FIG. 1 illustrates one implementation of a circuitry access system.

FIG. 1 illustrates one implementation of an access control 110 for regulating access to embedded circuitry of an integrated circuit 115. Integrated circuit 115 is shown with addressable circuit elements 120, 122, 124, 126. Addressable circuit element 126 includes sub-addressable circuit elements 130, 132, 134. An integrated circuit may have any number of addressable circuit elements, the access of which may be controlled by access control 110. Examples of addressable circuit element include, but are not limited to, a scalable performance measurement macro (SPM), a read only memory (ROM), a static random access memory (SRAM), a processor core, and any combinations thereof.

Access control 110 includes a first storage element 140 and a second storage element 145. First storage element 140 includes a listing 150 of unique identifiers for one or more addressable circuit elements of integrated circuit 115. Listing 150 may include unique identifiers for any or all of the possible addressable circuit elements of one or more integrated circuits. A unique identifier includes information that allows identification of a particular circuit element amongst a larger group of circuit elements. In one example, such information may include a circuit address that may be utilized by access control 110 to address a corresponding circuit element of integrated circuit 115. A unique identifier may also include other information stored in association with each unique identifier. Such additional information includes, but is not limited to, an indicator as to the one or more access restrictions on the circuit element, one or more bits representing a passcode, one or more bits representing a change in controller status, and any combinations thereof. Additional information on various types of information that may be included in a unique identifier will be discussed further below. First storage element 140 may be any memory element capable of storing listing 150. Examples of memory elements include, but are not limited to, one or more read only memories (ROM), one or more random access memories (RAM), one or more register arrays, one or more field programmable gate arrays (FPGA), one or more arrays of fuses, and any combinations thereof.

Access control 110 also includes a selector 155 that is electrically connected to first storage element 140 and second storage element 145. Selector 155 includes circuitry configured to distinguish one or more subsets of unique identifiers from listing 150. Each subset of unique identifiers may include one or more unique identifiers corresponding to circuit elements that have differing degrees of access restriction thereon. For example, listing 150 may include six unique identifiers each corresponding to one of circuit elements 120, 122, 124, 130, 132, 134. In this example, three of the six elements (e.g., 120, 130, and 134) are restricted such that a user's ability to access the circuitry can be limited (e.g., circuit elements 120, 130, and 134 may be accessible by the supplier of integrated circuit 115, but not accessible by a customer that later purchases integrated circuit 115). Selector 155 distinguishes between a first subset of unique identifiers representing circuit elements 122, 124, and 132, which are not restricted for use, and a second subset of unique identifiers representing circuit elements 120, 130, and 134, which are restricted for use. A variety of mechanisms for assisting selector 155 with distinguishing between subsets and a variety of circuitry to enable selector 155 to distinguish and restrict access thereupon are contemplated. In one example, a mechanism for assisting selector 155 may include having each unique identifier include information as to which restriction level is to be applied to the circuit element represented by the unique identifier (e.g., one or more bits may be associated with address information of a unique identifier for indicating a restriction level of one or more restriction levels for circuit elements). One example of circuitry for a selector, such as selector 155, is described below in relation to FIG. 2. Other examples of mechanisms and circuitry will be clear to those of ordinary skill from the disclosure herein.

Second storage element 145 is connected to selector 155 and/or first storage element 140 for receiving a subset of the unique identifiers of listing 150 that can be accessed at a given time. Returning to the example from above, if the integrated circuit is being used by an entity that has access privileges to restricted circuit elements (120, 130, 134) and unrestricted circuit elements (122, 124, 132), selector 155 allows second storage element 145 to receive unique identifiers for all allowed circuit elements. In this case, second storage element 145 would receive a unique identifier for each of circuit elements 120, 122, 124, 130, 132, 134. If integrated circuit 115 is being used by an entity that has access privileges to only unrestricted circuit elements (122, 124, 132), selector 155 allows second storage element 145 to receive unique identifiers for only circuit elements 122, 124, and 132. Second storage element 145 receives a unique identifier for only circuit elements 122, 124, and 132.

Second storage element 145 is configured to store unique identifiers of a subset of listing 150 without providing any indication of the absence of one or more unique identifiers of listing 150 that are not included in the subset. Returning again to the example from above, when the subset of allowed unique identifiers includes unique identifiers for only circuit elements 122, 124, and 132, the unique identifiers are stored in a manner that when the unique identifiers are output from second storage element 145, there are no gaps between the unique identifiers in an output data stream or any other clear indicators of the fact that a unique identifier from listing 150 is missing.

Second storage element 145 includes an output 160 for allowing a user of integrated circuit 150 to access one or more of the addressable circuit elements for which a unique identifier is stored in second storage element 145. Output 160 may include one or more electrical connections and/or one or more circuit elements configured to allow address information from unique identifiers stored in second storage element 145 to be utilized to address circuit elements in one or more integrated circuits, such as integrated circuit 115.

Second storage element 145 may be any writable memory element configured in conjunction with output 160 to allow a subset of unique identifiers from listing 150 that are stored therein to be output contiguously without gaps. Example memory elements for second storage element 145 include, but are not limited to, a register array, a RAM, and any combinations thereof. In one example, second storage element 145 is a register array having a plurality of storage location, each configured to receive one unique identifier of a subset of unique identifiers from listing 150.

Again, returning to the example from above, output 160 may read out a unique identifier for circuit element 122, followed by a unique identifier for circuit element 124, followed by a unique identifier for circuit element 132, without gaps between the unique identifiers in the data stream (e.g., for each clock cycle used to access integrated circuit 115, a unique identifier is accessed for an allowed circuit element, without a clock cycle passing that does not include a unique identifier being accessed). Although this example discusses a unique identifier for each clock cycle, it is contemplated that systems may be implemented where the pattern of accessing circuit elements of an integrated circuit occurs at intervals different than every clock cycle (e.g., every other clock cycle). In such a system, second storage element 145 is configured to output a unique identifier for every interval of the pattern of access without a gap until the entire subset of unique identifiers are output (e.g., one access cycle ends).

Access control 110 may also include an optional passcode entry circuit 165 for receiving a passcode 170 from a user of integrated circuit 115. A passcode may include one or more data bits. In one example passcode 165 may be entered indirectly. Examples of indirect entry include, but are not limited to, passcode entry via an ePROM, passcode entry via a register array, and any combinations thereof. In another implementation, passcode 165 may be entered directly by a user of integrated circuit 115. Examples of direct entry include, but are not limited to, user entry via an input device (e.g., a keyboard, mouse, microphone), user entry via a scanner (e.g., a barcode scanner, fingerprint reader), and any combinations thereof.

Selector 155 may include a mode circuit that includes circuitry for comparing an entered passcode with one or more data representing levels of access to the unique identifiers of listing 150. The one or more data may be stored in a variety of ways including, but not limited to, a listing of allowed passcodes and corresponding access level, utilization of a unique identifier in listing 150 for providing an allowed passcode, a done bit, a unique identifier, address information, and any combinations thereof. An example of utilizing listing 150 for including one or more allowed passcodes is discussed further below. For example, a unique identifier may include one or more bits that correspond to an allowed passcode. The unique identifier may also include one or more bits that correspond to an associated access level (e.g., when multiple restricted subsets of unique identifiers are included in listing 150, an indication of an access level may facilitate distinguishing by selector 155). Upon comparison of the entered passcode with the one or more bits of the allowed passcode, the mode circuit can determine if the passcode allows access to unique identifiers that are protected by the allowed passcode.

Access control 110 with passcode entry circuit 165 may operate such that a passcode is not necessary to allow unrestricted unique identifiers (e.g., unique identifiers having a level of restriction that allows all users access) to be received by second storage element 145. Alternatively, passcode entry circuit 165 may be configured to always require a passcode. The passcode entered will determine access the one or more subsets of unique identifiers allowed by selector 155 to be received by second storage element 145.

Although access control 110 is shown in FIG. 1 as connected to a single integrated circuit 115, it is contemplated that alternative implementations may include an access control (e.g., access control 110) being connected to a plurality of integrated circuits for controlling access to circuitry thereon. For example, a single access control according to any one of the embodiments herein, may be connected in a system to a plurality of integrated circuits.

Figure 2:
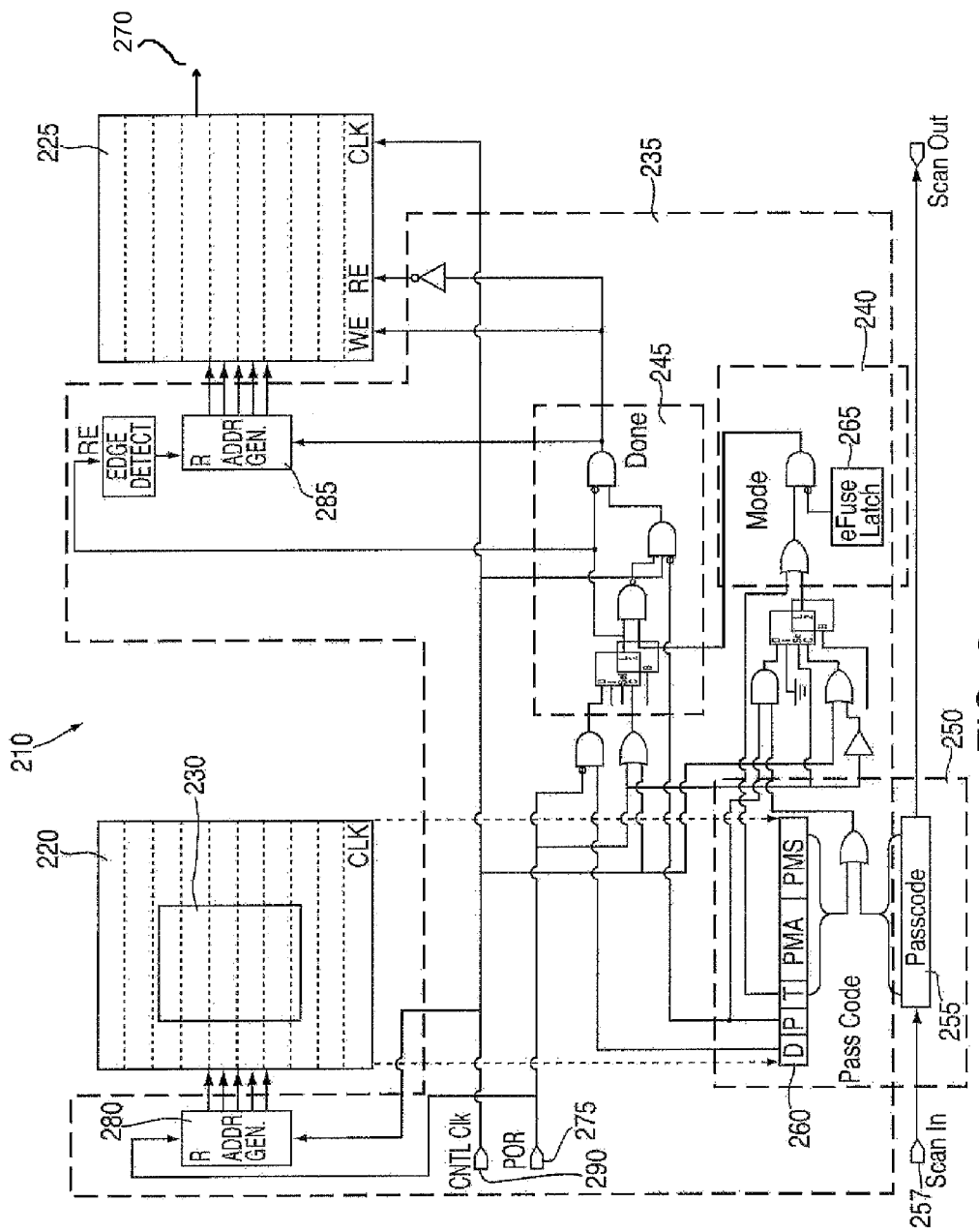
FIG. 2 illustrates another implementation of a circuitry access system.

FIG. 2 illustrates another implementation of an access control 210 for controlling access to addressable circuit elements of an integrated circuit. Access control 210 includes a first storage element 220 and a second storage element 225. In one example, first storage element 220 is a ROM and second storage element 225 is a register array. First storage element 220 includes a listing 230 of unique identifiers each corresponding to an addressable circuit element of one or more integrated circuits. Access control 210 also includes a selector 235. Selector 235 includes a mode circuit 240, a done circuit 245, and a passcode entry circuit 250. Passcode entry circuit 250 is configured to allow entry of a passcode 255 (e.g., which may be scanned in via integrated circuit data input 257). When passcode 255 matches a stored allowed passcode 260, passcode entry circuit 250 indicates the match to mode circuit 240 (e.g., a bit by bit XNOR gate passes a data "1" to the data port of a latch included in mode circuit 240 when entered passcode 255 matches allowed passcode 260). In one example, allowed passcode 260 may be stored in listing 230 along with the unique identifiers. In one such example, one or more bits of each unique identifier may be utilized to designate the unique identifier as an allowed passcode.

Mode circuit 240 is configured to set the mode of selector 235 to allow or restrict access to certain unique identifiers of listing 230 based on the matching of the passcodes. Mode circuit 240 includes an access limitation circuit 265. An access limitation circuit, such as access limitation circuit 265, includes circuitry that can restrict mode circuit 240 to never allowing access to restricted unique identifiers. For example, access limitation circuit 265 may be set to instruct mode circuit 240 to never allow selector 235 to allow unique identifiers corresponding to circuit elements that are to be restricted (e.g., those to be accessed only by an integrated circuit supplier). Access limitation circuit 265 is shown as an electronic fuse (eFuse) latch. Other circuitry that allows permanent or temporary setting of the mode circuit to not allow access regardless of the matching of the passwords may be substituted for the eFuse.

Done circuit 245 is configured to detect when the last unique identifier in an allowed subset is read from first storage element 220 to second storage element 225. Done circuit 245 disables writing to second storage element 225 and enables unique identifiers stored therein to be read via output element 270.

Access control 210 also includes a power-on input 275. Power-on input 275 may be utilized for performing a power-on reset. In such a reset, power-on input 275 is pulsed logically high, an address generator 280 is reset, a latch of done circuit 245 is flushed to logical "0", a latch of mode circuit 240 is flushed to logical "0", and an address generator 285 is reset. Address generator 280 allows sequential, contiguous access to first storage element 220. Address generator 285 allows sequential access only when done circuit 245 allows to second storage element 225.

In one exemplary implementation of access control 210, a user may enter a passcode 255 via input 257. In this example, stored allowed passcode 260 includes one or more "D" bits allowing the indication of a last unique identifier of listing 230 that has been transferred to storage element 225, one or more "P" bits indicating that the item of listing 230 is a passcode and not an address for addressing circuit elements, and one or more "T" bits for indicating the level of access allowed by the matching of entered passcode 255 with allowed passcode 260. In this example, when the one or more "P" bits is a logical "1", the item in listing 230 is a passcode. In an alternate embodiment, a "P" bit of a logical "0" or any other combination of bits may indicate that an item is a stored passcode. The logical 1 overrides a latch (e.g., an L1-L2 latch) of done circuit 245 and prevents address generator 285 from being clocked. The logical 1 also preconditions data port of a latch (e.g., an L1-L2 latch) of mode circuit 240 to look for comparison of the passcodes (e.g., via a comparison of passcode 255 with a scan only register containing data 260 read from first storage element 220). When passcode 255 matches passcode 260, a bit by bit XNOR gate passes a logical "1" to the data port of a latch of mode circuit 240. In a comparison of passcode 255 with passcode 260 one or more of the bits may be compared. In one example, only bits in locations of a unique identifier item that would otherwise represent address information may be compared. For example, passcode 260 includes one or more "PMA" bits and one or more "PMS" bits that are used when the item in listing 230 is a unique identifier representing an addressable circuit element as address information to indicate the circuit element represented. In such an example, the PMA and PMS bits may be the only bits compared to a passcode such that "D", "P", and "T" bits are not part of the comparison. In other implementations, any or all of the bits of passcode 260 may be compared to an entered passcode 255. If the latch of mode circuit 240 receives a logical "1" (indicating matching of passcodes), access control 210 operates in an unrestricted mode.

When passcode circuit 250 passes a logical "0" to mode circuit 240, access control 210 restricts access to one or more unique identifiers in listing 230. As discussed above, each unique identifier in this example includes one or more bits that indicate the level of access associated for access to the individual unique identifier (e.g., one or more "T" bits). For example, when passcode circuit 250 passes a logical "0" to mode circuit 240 and the unique identifier being considered by selector 235 for passing to second storage element 225 includes one or more "T" bits that indicates a restricted access level associated with the unique identifier. In one such example, where a single "T" bit is used to indicate restricted or non-restricted status and a logical "1" indicates a restricted status, the "T" bit feeds a latch of mode circuit 240 which disables the write access to second storage element 225 and does not allow address generator 285 to increment.

In one implementation, a unique identifier may include one or more done bits (e.g., "D" bits) that allow indication of a terminal unique identifier in listing 230. In one example, a "D" bit set to a logical "1" may indicate a last unique identifier in listing 230. When a "D" bit=1 of a unique identifier is read by selector 235, it sets a latch of done circuit 245 to restrict a clock input 290 from clocking address generator 285, which is set to not allow writing to second storage element 225 and to only allow reading from second storage element 225. When a "D" bit=0 of a unique identifier is read by selector 235 (and "P" bit=0, "T" bit=0), clock input 290 is allowed to pass to second storage element 225 and to address generator 285 to allow writing to second storage element 225 of the corresponding unique identifier.

It is noted that access control 210 is utilized to distinguish between two access levels: a first access level that allows access to all unique identifiers of listing 230 and a second access level that allows access to a subset of unique identifiers from listing 230. Modification of the circuitry of access control 210 may be made to allow selector 235 to distinguish between three or more access levels (e.g., having circuitry for supporting different levels of access based on a plurality of "T" bits indicating one of three or more access levels allowed by a certain passcode matching and having two or more passcodes 260 stored in listing 230 for indicating allowed access via matching of passcodes 260 to entered passcode 255).

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A circuitry access system for controlling access to addressable circuit elements of an integrated circuit, each circuit element having an address, the system comprising:
   a first storage element having a first listing of unique identifiers, each identifier representing one of the addressable circuit elements;
   a selector in electrical connection with said first storage element for distinguishing a first subset of unique identifiers from said first listing of unique identifiers, the first subset representing circuit elements allowed to be addressed by a user; and
   a second storage element in electrical connection with said selector for receiving said first subset and storing said first subset in an arrangement that does not include an indication of the absence of any unique identifier of the first listing that is not included in said first subset, said second storage element including an output for allowing the user of the integrated circuit to access one or more of the addressable circuit elements corresponding to said first subset of unique identifiers without allowing the user to identify any unique identifier of the first listing that is not included in said first subset.

2. A circuitry access system according to claim 1, wherein said first subset of unique identifiers includes an identifier for each of all the addressable circuit elements of the integrated circuit.

3. A circuitry access system according to claim 1, wherein said selector further comprises an access limitation circuit configured to permanently disable writing of said first subset to said second storage element.

4. A circuitry access system according to claim 1, wherein said first listing of unique identifiers includes at least one unique identifier that includes one or more bits representing an authorized passcode.

5. A circuitry access system according to claim 1, wherein the unique identifiers each include:
   one or more address bits representing an address of a corresponding circuit element of the integrated circuit; and
   one or more access bits representing an access level of said corresponding circuit element, wherein said selector utilizes said one or more address bits for each unique identifier of said first listing to determine which unique identifiers of said first listing to allow to be stored in said second storage element.

6. A circuitry access system according to claim 1, wherein said output is configured to stream at least a portion of each unique identifier stored therein contiguously without gaps between each unique identifier.

7. A circuitry access system according to claim 1, wherein said selector includes:
   a passcode entry circuit for receiving a first passcode from a user of the integrated circuit; and
   a mode circuit electrically configured to change access to said first listing in said first storage element based on said first passcode, wherein if said first passcode corresponds to authorized access to a second subset of unique identifiers of said first listing that are not part of said first subset, said mode circuit allows said second subset to be written to said second storage element.

8. A circuitry access system according to claim 7, wherein said passcode entry circuit is configured to receive a secondary security level passcode from a user of the integrated circuit wherein said secondary security level passcode is utilized by said mode circuit to allow a third subset of unique identifiers of said first listing that are not part of said first or second subset to be written to said second storage element.

9. A circuitry access system according to claim 1, wherein said selector includes a done circuit in electrical connection with said second storage element, for changing access to said second storage element between a read only setting, allowing said output to read out at least a portion of each unique identifier stored in said second storage element, and a write only setting, allowing one or more unique identifiers from said first storage element to be written to said second storage element.

10. A circuitry access system according to claim 1, wherein said first storage element includes a read only memory and said second storage element includes a register array.

11. A circuitry access system according to claim 1, further comprising a purge circuitry for purging said second storage element at power-on of the integrated circuit.

12. A circuitry access system according to claim 1, wherein the circuitry access system is located off of the integrated circuit.

13. A circuitry access system according to claim 12, wherein the circuitry access system controls access to addressable circuit elements of a plurality of integrated circuits.

14. A method of controlling access to addressable circuit elements of an integrated circuit, each element having an address, the method comprising:
   storing a plurality of unique identifiers in a first memory, each of the plurality of unique identifiers corresponding to an address of one of the addressable circuit elements;
   selecting a first subset of unique identifiers from the plurality of unique identifiers and storing the first subset to a second memory in an arrangement that does not include an indication of the absence of any unique identifiers that are not in the first subset, the first subset representing circuit elements allowed to be addressed by a user, and allowing the user of the integrated circuit to utilize the first subset stored in the second memory to gain access to the addressable circuit elements corresponding to the unique identifiers of the first subset without allowing the user to gain access to one or more addressable circuit elements corresponding to any of the plurality of unique identifiers that is not included in the first subset.

15. The method according to claim 14, further comprising purging the second memory at a power-on of the integrated circuit.

16. The method according to claim 14, further comprising:

copying a second subset of the plurality of unique identifiers to the second memory in an arrangement that does not include an indication of the absence of any unique identifiers that are not in the first and second subsets; and allowing the user to utilize the first and second subsets stored in the second memory to gain access to the addressable circuit elements corresponding to the unique identifiers of the first and second subsets.

17. The method according to claim 14, further comprising:

authenticating a passcode received from the user;

copying a second subset of the plurality of unique identifiers to the second memory in an arrangement that does not include an indication of the absence of any unique identifiers that are not in the first and second subsets, said authenticating step allowing said copying of said second subset; and allowing the user to utilize the first and second subsets stored in the second memory to gain access to the addressable circuit elements corresponding to the unique identifiers of the first and second subsets.

* * * * *